(12) United States Patent
Musarra et al.

(10) Patent No.: US 7,984,213 B2
(45) Date of Patent: Jul. 19, 2011

(54) CONTROL DEVICE FOR A USB INTERFACE AND CONTROL METHOD THEREOF

(75) Inventors: Federico Musarra, Sant'Agata Li Battiati (IT); Marco Martini, Acireale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 251 days.

(21) Appl. No.: 12/130,852

(22) Filed: May 30, 2008

(65) Prior Publication Data
US 2008/0301339 A1    Dec. 4, 2008

(30) Foreign Application Priority Data

May 31, 2007   (IT) .............................. MI2007A1104

(51) Int. Cl.
*G06F 3/00*    (2006.01)
*G06F 15/16*   (2006.01)
(52) U.S. Cl. .......................................... 710/58; 709/248
(58) Field of Classification Search .................... 710/58
See application file for complete search history.

(56) References Cited

U.S. PATENT DOCUMENTS

| | | | | |
|---|---|---|---|---|
| 5,808,481 | A * | 9/1998 | Thompson | 326/83 |
| 6,256,682 | B1 * | 7/2001 | Gudan et al. | 710/14 |
| 2002/0010821 | A1 * | 1/2002 | Yu et al. | 710/100 |
| 2007/0106825 | A1 * | 5/2007 | Duval et al. | 710/106 |

* cited by examiner

*Primary Examiner* — Henry W Tsai
*Assistant Examiner* — Juanito C Borromeo
(74) *Attorney, Agent, or Firm* — Lisa K. Jorgenson; Robert Iannucci; Seed IP Law Group PLLC

(57) ABSTRACT

A control device for a USB interface including at least one first terminal for inputting the data to be transmitted and at least one second terminal for the transmission of the packet data on a bus; the packet data include one end-of-packet signal. The USB interface includes one circuit for the data transmission on said at least one second terminal; the USB interface is adapted to receive as an input a signal for the activation of the transmission circuit when data are received from the at least one first terminal and the transmission circuit includes a bias circuit. The control device includes a circuit for the detection of an end-of packet signal on said bus and a control circuit adapted to activate the bias circuit of the transmission circuit if said end-of-packet signal is detected by said detection circuit.

10 Claims, 5 Drawing Sheets

CONTROL DEVICE FOR A USB INTERFACE AND CONTROL METHOD THEREOF

CROSS-REFERENCE TO RELATED APPLICATION

This application claims the benefit under 35 U.S.C. §119(a) of Italian Patent Application No. MI 2007A 001104 filed May 31, 2007, which is incorporated herein by reference in its entirety.

BACKGROUND

1. Technical Field

The present invention relates to a control device for a Universal Serial Bus (USB) interface and to a control method thereof.

2. Description of the Related Art

USB interfaces allowing the transmission and reception of digital data are known in the state of the art; a typical USB interface is shown in FIG. 1. The interface includes two terminals, VM and VP, for inputting the data to be sent, the D+ and D− terminals for the data transmission and a terminal for inputting the OE signal to enable the data transmission; the USB interface includes a level shifter circuit 10 for shifting the level of the OE signal and of the data received on the VM and VP terminals, and driver circuitry 1 with drivers for the transmission of the data and drivers for the reception of the data. The driver which is typically used for the transmission of the data is the differential driver Dr which is controlled by the input OE signal. The driver circuit also includes a bias circuit 40 for biasing the differential driver Dr.

The differential driver Dr is normally switched off during the reception of the data in order to reduce the energy consumption of the USB interface. When the device must operate in a transmission mode, the OE signal is set at a low logic level and the bias circuit of the Dr driver is activated. However, the activation of said bias circuit requires a certain time period and the data transmission may not start before the differential driver Dr is biased, therefore the transmission starts with a certain delay.

In some applications the delay between the enabling of the driver and the start of the data transmission may not allow an appropriate bias of the differential driver Dr. In this case, the bias transistors of the Dr driver imply an anomaly in the transmission of the first bit of the packet of digital data to be transmitted, thus reducing the quality of the transmitted signal.

FIG. 2 shows a data packet PD transmitted through a USB interface on the D+ and D− terminals with the above disclosed anomaly; the signal 11 indicates the voltage signal on the line D+ while the signal 12 indicates the voltage signal on the line D−. The signals 11 and 12 are alternately at a high logic level (voltage of 3 Volts) and at a low logic level (voltage of 0 Volts); the transitions between the high and low state of the signals 11 and 12 are indicated by the corresponding letters K and J and the data packet PD ends with an end-of-packet signal EOP. In FIG. 2 the first bit of the data packet, which corresponds to a C transition, is transmitted over a longer time period D1 than the waiting time period Dm (i.e. the transmission time period of every other bit of the packet) because of the bias transistors of the Dr driver. The transmission time period D1 of the first bit of the packet PD has a great influence on the evaluation of the average ratio of data which is the basis for the construction of the eye diagram; the eye diagram is in fact used to verify whether the transmission of the packet complies with the desired specifications. The packet PD is segmented by using the average time of bits (inverse of the average ratio of data), i.e. the average time for the transmission of the bits in the packet, as a reference and it is overlapped after each segment to create the eye. The eye diagram in FIG. 3 is that obtained for the packet PD; an error in the evaluation of the bit time, due to the time D1 of the first bit, leads to the misalignment of the bits of the eye and to a wrong evaluation of the disturbances.

BRIEF SUMMARY

One embodiment is a control device for a USB interface which improves the quality of the data transmission.

One embodiment is a control device of a USB interface including at least one first terminal for inputting the data to be transmitted and at least one second terminal for the transmission of the packet data on a bus, said packet data including an end-of-packet signal, said USB interface including a circuit for the transmission of data on said at least second terminal, said USB interface being adapted to receive as an input a signal for the activation of said transmission circuit when data are received from said at least one first terminal, said transmission circuit including a bias circuit. The control device includes a circuit for the detection of an end-of-packet signal on said bus and circuitry configured to activate the bias circuit of the transmission circuit if said end-of-packet signal is detected by said detection circuit.

One embodiment is a control method for a USB interface.

BRIEF DESCRIPTION OF THE SEVERAL VIEWS OF THE DRAWINGS

Features will become apparent from the following detailed description of a practical embodiment thereof, shown by way of non-limitative example in the accompanying drawings, in which.

DETAILED DESCRIPTION

Figure 1:
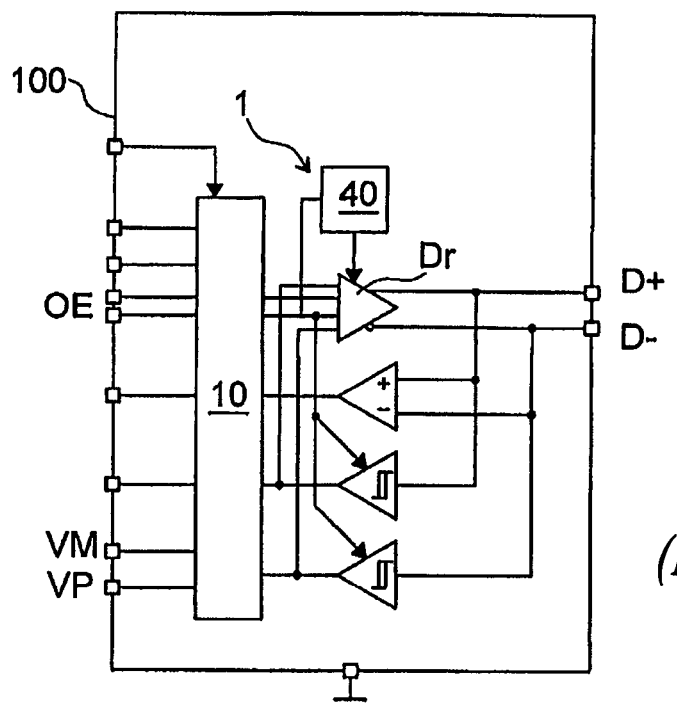
FIG. 1 shows a circuit diagram of a USB interface according to the known art.
Figure 2:
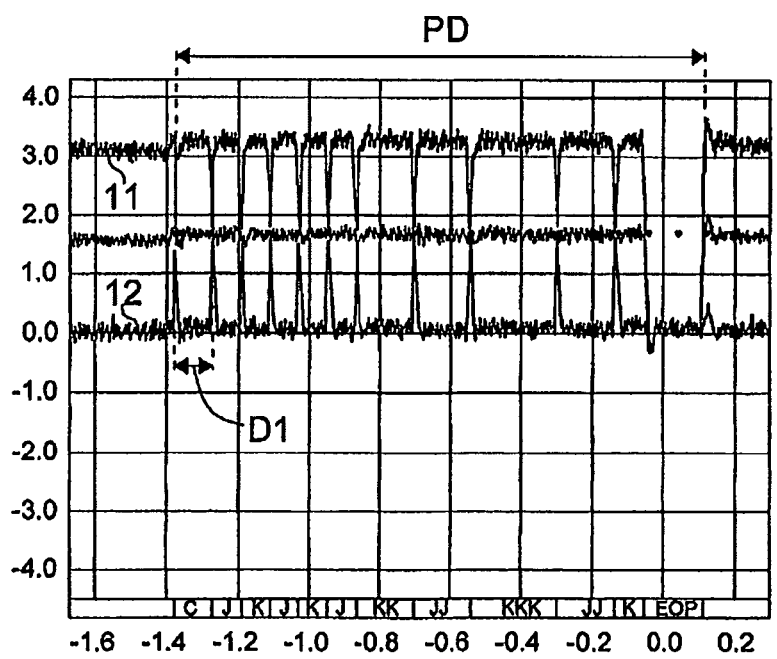
FIG. 2 is a diagram of the transmission of a data packet by means of the interface in FIG. 1.
Figure 3:
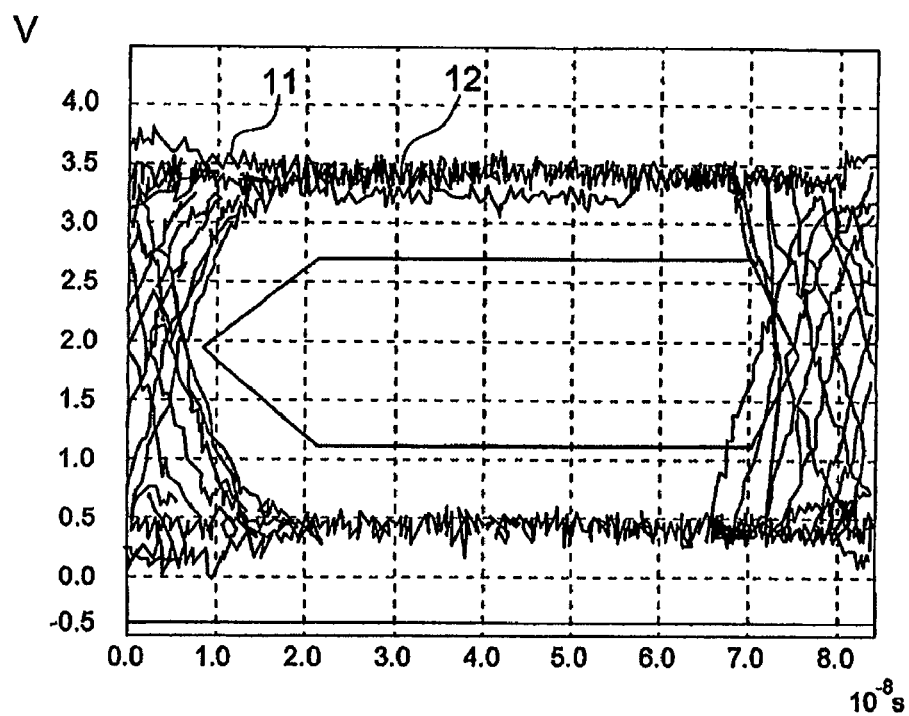
FIG. 3 is an eye diagram of the data packet in FIG. 2.
Figure 4:
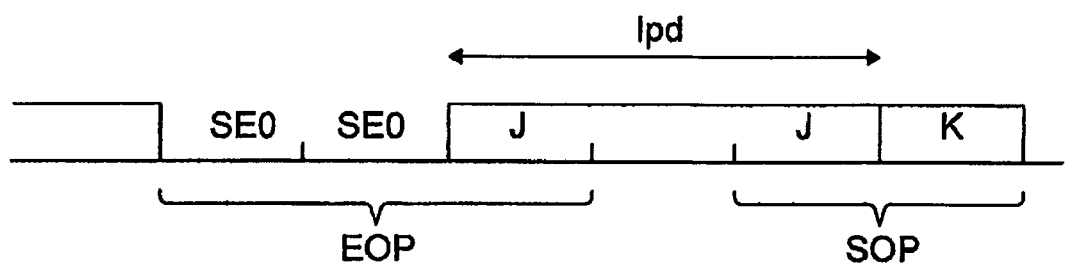
FIG. 4 shows the transmission of data packets according to one embodiment.
Figure 9:
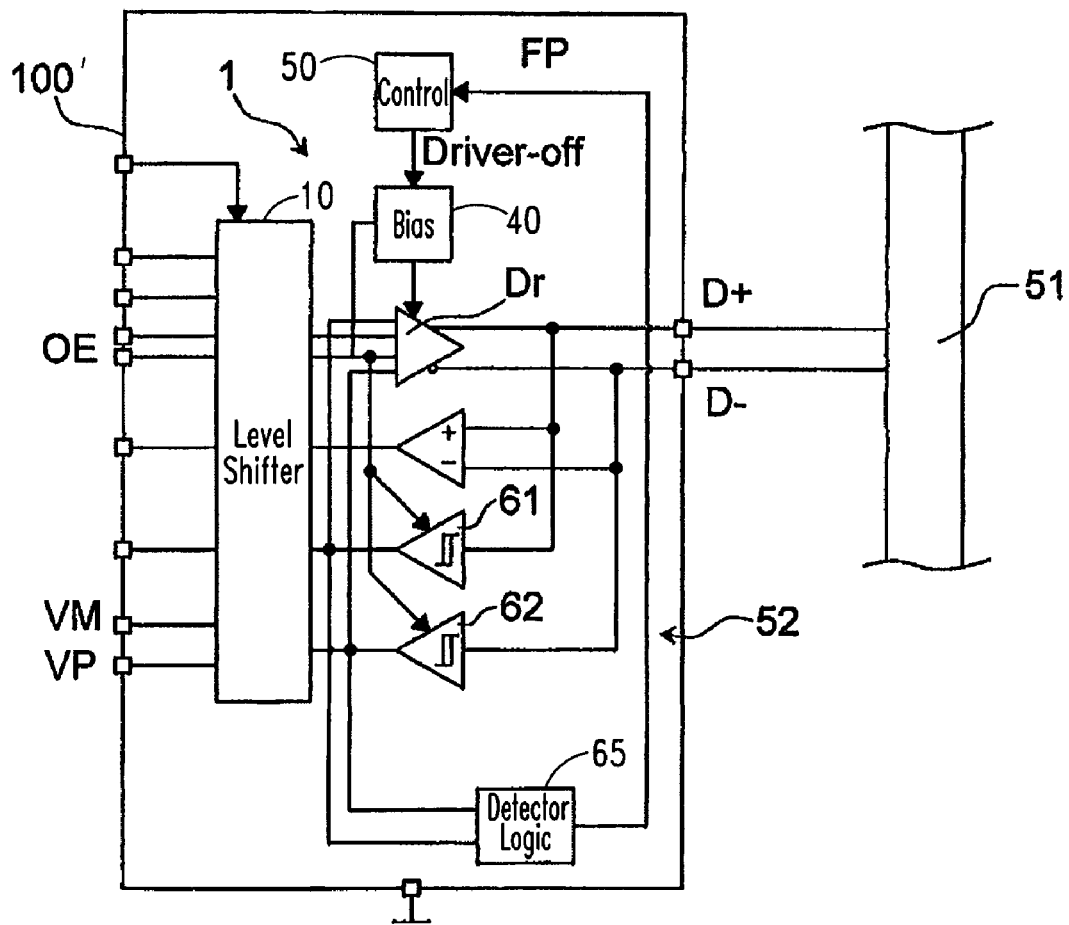
FIG. 9 is a circuit diagram of a USB interface including the control device in FIG. 6.

FIG. 4 shows the transmission of data packets according to one embodiment. Normally, a USB-type bus is based on a type of operation where a single device acts as a master and the other devices connected thereto act as slaves. In this manner the slave device is not allowed to start a communication unless the master device has not requested it; the sending of a data packet in the USB bus will immediately follow the switching in the transmission mode of a device. The method includes a prediction of the enabling of the differential drivers of the USB interface intended for the data transmission. Said method includes a step (FIG. 5) for identifying, on the USB bus, the end-of-packet signal EOP of a data packet which is transmitted along the USB bus. This may be detected by reception circuits for "single ended"-type signals of a USB interface 100' (FIG. 9). A "single ended"-type signal consists of a Single Ended Zero (SE0) state for a time period of two bits followed by a transition state J; there is one SE0 state on the USB bus when the signals 11 and 12 on the D+ and D− terminals are at a low logic level (for instance at a value of 0 volts).

However, not every data packet is sent to the device including the USB interface 100' since multiple devices with respective USB interfaces may be connected to the same USB bus; therefore a step is preferable for verifying whether the single device including the USB device 100' should transmit or not. The USB protocol determines that if the slave device must respond to a request of the master device within a time period Ipd in the range between 2 and 7.5 times the time period of a bit Dm; the time period Ipd, also designated "inter-packet delay", is defined as the time period between the transition from the SE0 state to the J state used for the EOP signal and the J-K transition which starts the new SOP data packet.

The control method, starting from a step S of disabling the differential drivers intended for the transmission of the data (the Dr driver of the USB interface 100), includes a step A for detecting an end-of-data-packet signal, i.e. a signal of the SE0 state, on the USB bus, and for simultaneously enabling said differential drivers (Dr driver). The method preferably includes a step B for counting the Ipd period; if during the count or at the end of the count of the Ipd time period the OE signal is set at a low logic level, i.e. the differential driver Dr is activated, the control ends with the step C otherwise the differential driver Dr is disabled and returns to the step S.

Figure 5:
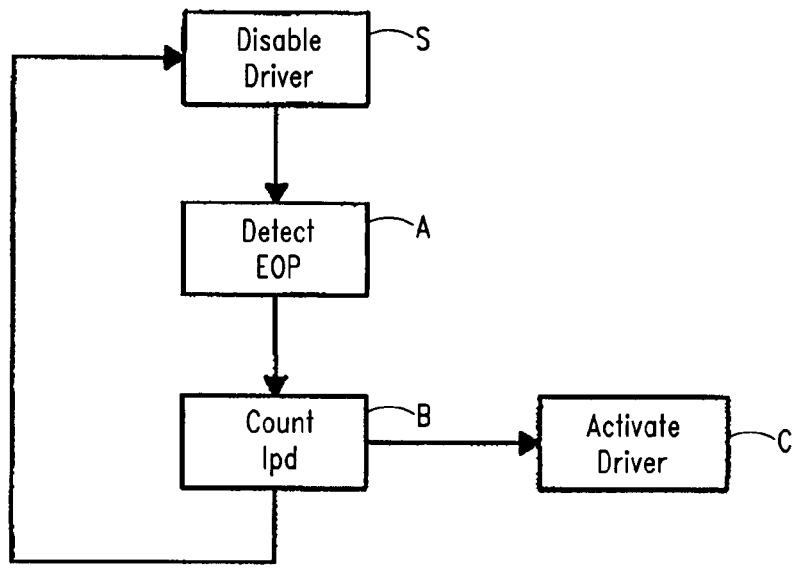
FIG. 5 is a flow diagram of the control method for a USB interface according to one embodiment.
Figure 6:
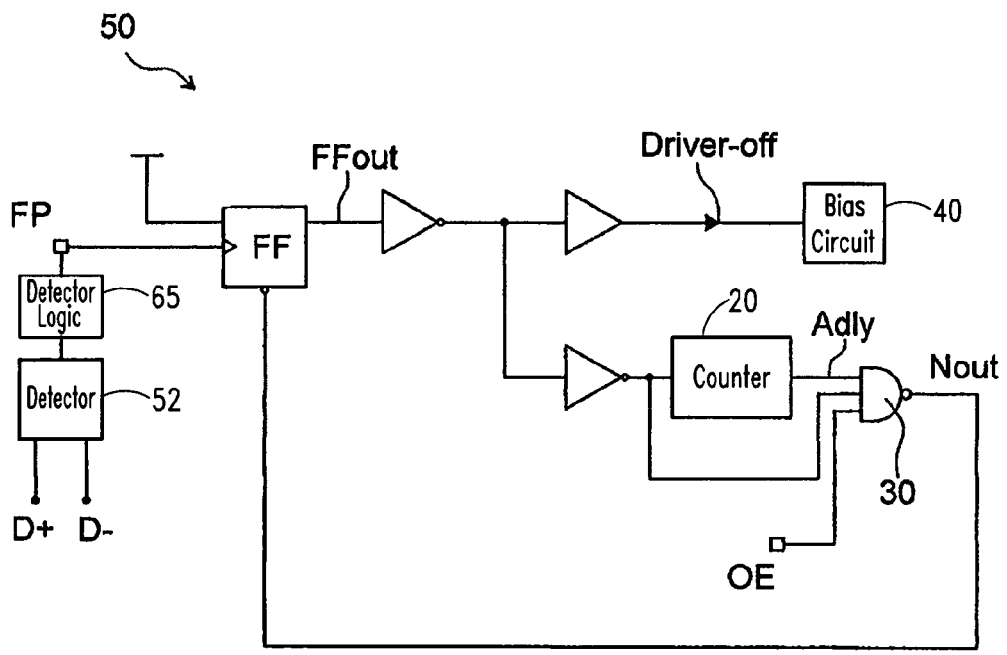
FIG. 6 is a circuit diagram of a control device for a USB interface according to one embodiment.

FIG. 6 shows the circuit diagram of a control device 50 for a USB interface that operates according to the method in FIG. 5, and FIG. 9 shows the USB interface 100' provided with the control device 50. The device 50 includes a flip-flop FF which has as an input the FP signal that indicates the SE0 state and generates the output signal FFout which is inputted into the counter 20. The FP signal derives from a detection circuit 52 which detects the SE0 state and is connected to the D+ and D− terminals connected to the USB bus 51. The circuit 52 performs a reading on the USB bus 51 through the D+ and D− terminals; the circuit 52 (as may be appreciated in greater detail in FIG. 9) includes two Schmitt triggers 61 and 62, having as respective inputs the signals deriving from the D+ and D− terminals, respectively, and the outputs of which are inputted into a logic circuit 65 adapted to detect the SE0 state on the D+ and D− terminals and to generate the FP signal. A NAND port 30 has inputs the output signal Adly of the counter 20, the output signal of the flip-flop FF (via two inverters), and the OE signal. The output Nout of the NAND port 30 is inputted into the flip-flop FF. The signal FF negated represents the Driver-off signal for the control of the bias circuit 40 that biases the differential driver Dr.

Normally, the FP, FFout and Adly signals are at a low logic level when no end-of-packet state is detected while the Driver-off and Nout signals are at the high logic level.

When an end-of-packet state SE0 is detected by means of the corresponding FP signal, the same signal switches from the low logic level to the high logic level; in this manner also the FFout signal switches from the low logic level to the high logic level and the Driver-off signal switches from the high logic level to the low logic level controlling the switching on of the bias circuit 40.

Preferably, the Adly signal will remain at the low logic level for the Ipd time period which is counted by the counter 20 maintaining the output signal Nout at a high logic level. At the end of the counting of the Ipd time of seven times the time of one Dm bit, if the OE signal is still at the high logic level, i.e. no transmission has been requested by the master device, the output signal Nout will switch to the low logic level; this will allow to reset the flip-flop FF and force the Driver-off signal to the high logic level switching off the bias circuit 40.

On the contrary, if the OE signal switches to the low logic level, i.e. a transmission has been requested by the master device, the output signal Nout will remain at the high logic level; this will allow to maintain the Driver-off signal at the low logic level and the bias circuit 40 switched on.

Since the circuit 40 needs a time period of about twice the time of one bit to bias the differential driver Dr and the data transmission will start after at least four times the time of one bit (i.e. twice the time of one bit for the two SE0 states and the minimum time period Ipd), the control device in FIG. 6 will guarantee an appropriate bias of the differential driver Dr thus avoiding the transient behavior which causes the extension of the time period of the first transmitted bit.

Figure 7:
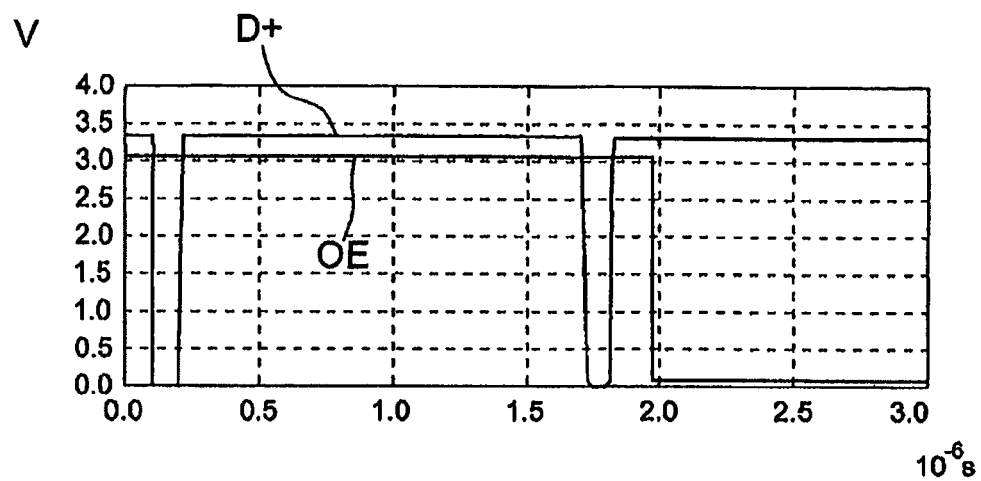
FIG. 7 shows a time diagram of signals of a USB interface with the control device in FIG. 6 in case of no transmission of a following data packet.
Figure 8:
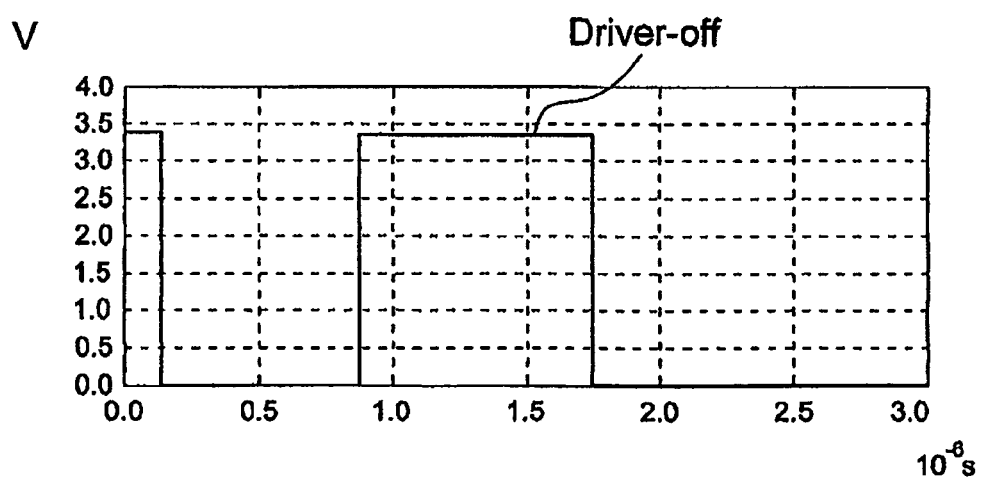
FIG. 8 shows a time diagram of signals of a USB interface in with the control device in FIG. 6 in case of transmission of a following data packet.

FIGS. 7 and 8 show time diagrams of the D+, OE and Driver-off signals deriving from simulations on the interface 100' in FIG. 9 with the control device in FIG. 6; in this case, since the D− signal is always zero and the FP signal is derived by a combinatory logic of the NOR type on the D+ and D− signals, the signal FP negated will coincide with the D+ signal. It may be appreciated that in the presence of a SE0 state on the USB bus, the signal FP negated switches to the high logic level and the Driver-off signal switches to the low logic level; once the Ipd time period, which is seven times the time of one bit, has passed, the Driver-off signal returns high as the OE signal remains high. Subsequently, again the signal FP negated switches to the low logic level. Then, when in presence of another SE0 state on the USB bus 51, the signal FP negated switches to the high logic level and the Driver-off signal switches to the low logic level; when the count of the Ipd time period of seven times the time of one bit starts, the Driver-off signal remains low as the OE signal is switched to the low logic level; a data transmission has been requested by the master device.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a Universal Serial Bus (USB) interface that includes a first terminal configured to input data to be transmitted and a second terminal configured to transmit packet data on a bus, said packet data including an end-of-packet signal, said USB interface including a transmission circuit configured to transmit the packet data on said second terminal, said USB interface being configured to receive as an input an activation signal for the activation of said transmission circuit when data are received from said first terminal, said transmission circuit including a bias circuit, the control device comprising:
 a detection circuit configured to detect an end-of-packet signal on said bus; and a control circuit configured to activate the bias circuit of the transmission circuit if said end-of-packet signal is detected by said detection circuit, wherein the control circuit includes:
    a flip-flop having first and second inputs and an output, the first input being coupled to an output of the detection circuit;
    a counter having an input, coupled to the output of the flip-flop, and an output; and
    a logic gate having first and second inputs and an output, the first input of the logic gate being coupled to an output of the counter, the second input of the logic gate being configured to receive the activation signal, and the output of the logic gate being coupled to the second input of the flip-flop.

2. A device according to claim 1, wherein said control circuit includes means for deactivating said bias circuit in case said activation signal is not received by the USB interface within a threshold time period.

3. A device according to claim 2, wherein said threshold time period is within a range from two or seven times a transmission time of one bit.

4. A device according to claim 1, wherein the USB interface includes an additional terminal for the transmission of data and said transmission circuit includes a differential driver.

5. A device according to claim 4, wherein said end-of-packet signal includes a low logic level state on both of the second and additional terminals, said low logic level state lasting twice a time of one bit, said detection circuit being configured to detect said low logic level state.

6. A control device for a Universal Serial Bus (USB) interface that includes a first terminal configured to input data to be transmitted and a second terminal configured to transmit packet data on a bus, said packet data including an end-of-packet signal, said USB interface including a transmission circuit configured to transmit the packet data on said second terminal, said USB interface being configured to receive as an input an activation signal for the activation of said transmission circuit when data are received from said first terminal, said transmission circuit including a bias circuit, the control device comprising:
    a detection circuit configured to detect an end-of-packet signal on said bus; and
    a control circuit configured to activate the bias circuit of the transmission circuit if said end-of-packet signal is detected by said detection circuit, wherein:
        the USB interface includes an additional terminal for the transmission of data and said transmission circuit includes a differential driver;
        said end-of-packet signal includes a low logic level state on both of the second and additional terminals, said low logic level state lasting twice a time of one bit, said detection circuit being configured to detect said low logic level state; and
        said detection circuit includes two Schmitt triggers, having respective inputs coupled to the second and additional terminals, and a logic circuit having inputs coupled to the outputs of the two Schmitt triggers, respectively, the logic circuit being configured to generate a signal representative of the presence of said low logic level state.

7. A Universal Serial Bus (USB) interface, comprising:
    a first terminal configured to input data to be transmitted;
    a second terminal configured to transmit packet data on a bus, said packet data including an end-of-packet signal;
    an additional terminal configured to transmit data;
    a transmission circuit configured to transmit data on said second terminal, said transmission circuit including a bias circuit and a differential driver configured to drive the second and additional terminals;
    an activation input terminal configured to receive an activation signal for the activation of said transmission circuit when data are received at said first terminal;
    a detection circuit configured to detect an end-of-packet signal on said bus and detect a low logic level state, said end-of-packet signal including said low logic level state on both of the second terminal and the additional terminal and lasting twice a time of one bit; and
    a control circuit configured to activate the bias circuit of the transmission circuit if said end-of-packet signal is detected by said detection circuit, wherein the detection circuit includes:
        two Schmitt triggers having respective inputs coupled to the second and additional terminals; and
        a logic circuit with inputs coupled to outputs of the two Schmitt triggers, respectively, the logic circuit being configured to generate a signal representative of the presence of said low logic level state.

8. The USB interface of claim 7, wherein said control circuit includes means for deactivating said bias circuit in case said activation signal is not received by the USB interface within a threshold time period.

9. The USB interface of claim 8, wherein said threshold time period is within a range from two or seven times a transmission time of one bit.

10. A Universal Serial Bus (USB) interface, comprising:
    a first terminal configured to input data to be transmitted;
    a second terminal configured to transmit packet data on a bus, said packet data including an end-of-packet signal;
    a transmission circuit configured to transmit data on said second terminal, said transmission circuit including a bias circuit;
    an activation input terminal configured to receive an activation signal for the activation of said transmission circuit when data are received at said first terminal;
    a detection circuit configured to detect an end-of-packet signal on said bus; and
    a control circuit configured to activate the bias circuit of the transmission circuit if said end-of-packet signal is detected by said detection circuit, wherein the control circuit includes:
        a flip-flop having first and second inputs and an output, the first input being coupled to an output of the detection circuit;
        a counter having an input, coupled to the output of the flip-flop, and an output; and
        a logic gate having first and second inputs and an output, the first input of the logic gate being coupled to an output of the counter, the second input of the logic gate being configured to receive the activation signal, and the output of the logic gate being coupled to the second input of the flip-flop.

* * * * *